Figure 1:
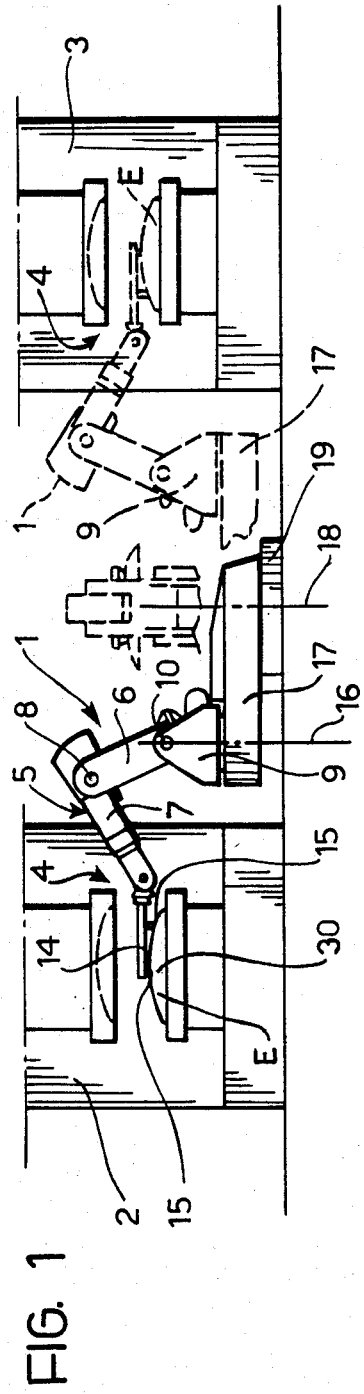

United States Patent [19]

Cigna

[11] Patent Number: 4,661,040

[45] Date of Patent: Apr. 28, 1987

[54] MANIPULATOR ROBOT, MORE PARTICULARLY FOR TRANSFERRING SHEET METAL ELEMENTS FROM A PRESSING STATION TO THE NEXT PRESSING STATION OF A PRESSING LINE

[75] Inventor: Paolo Cigna, Turin, Italy

[73] Assignee: Comau S.p.A., Turin, Italy

[21] Appl. No.: 680,431

[22] Filed: Dec. 11, 1984

[30] Foreign Application Priority Data

Dec. 12, 1983 [IT] Italy .............................. 54029/83[U]

[51] Int. Cl.[4] ................................................ B25J 9/04
[52] U.S. Cl. ............................ 414/744 R; 414/744 A; 414/749; 414/751; 901/14
[58] Field of Search ........... 414/744 R, 744 A, 744 B, 414/744 C, 749-753, 685, 694; 901/16; 37/103, 117.5

[56] References Cited

U.S. PATENT DOCUMENTS 3,010,587 11/1961 Hollinger ........................ 414/744 A
4,299,533 11/1981 Ohnaka ................................ 414/752
4,433,495 2/1984 Kishi ............................... 414/694 X

FOREIGN PATENT DOCUMENTS 1244940 9/1971 United Kingdom ................ 414/752

Primary Examiner—Robert J. Spar
Assistant Examiner—P. McCoy Smith
Attorney, Agent, or Firm—Sughrue, Mion, Zinn, Macpeak, and Seas

[57] ABSTRACT

A manipulator robot, particularly for transferring sheet metal elements from one pressing station to the next pressing station of a pressing line, includes a manipulating arm articulated to a base structure which is rotatably mounted for swivelling about a vertical axis on one end of a support lever the opposite end of which is rotatably mounted above a vertical axis on a fixed base. Electric drive motors are provided for effecting rotation of the support lever and of the base structure of the manipulating arm at speeds having a controlled ratio to each other and in opposite directions so as to move the element to be conveyed along a desired path at any desired speed and acceleration. An element pickup device is secured to the free end of the manipulating arm by means of a wrist joint which allows the pickup device to rotate about a longitudinal and a transverse axis of the manipulating arm.

1 Claim, 4 Drawing Figures

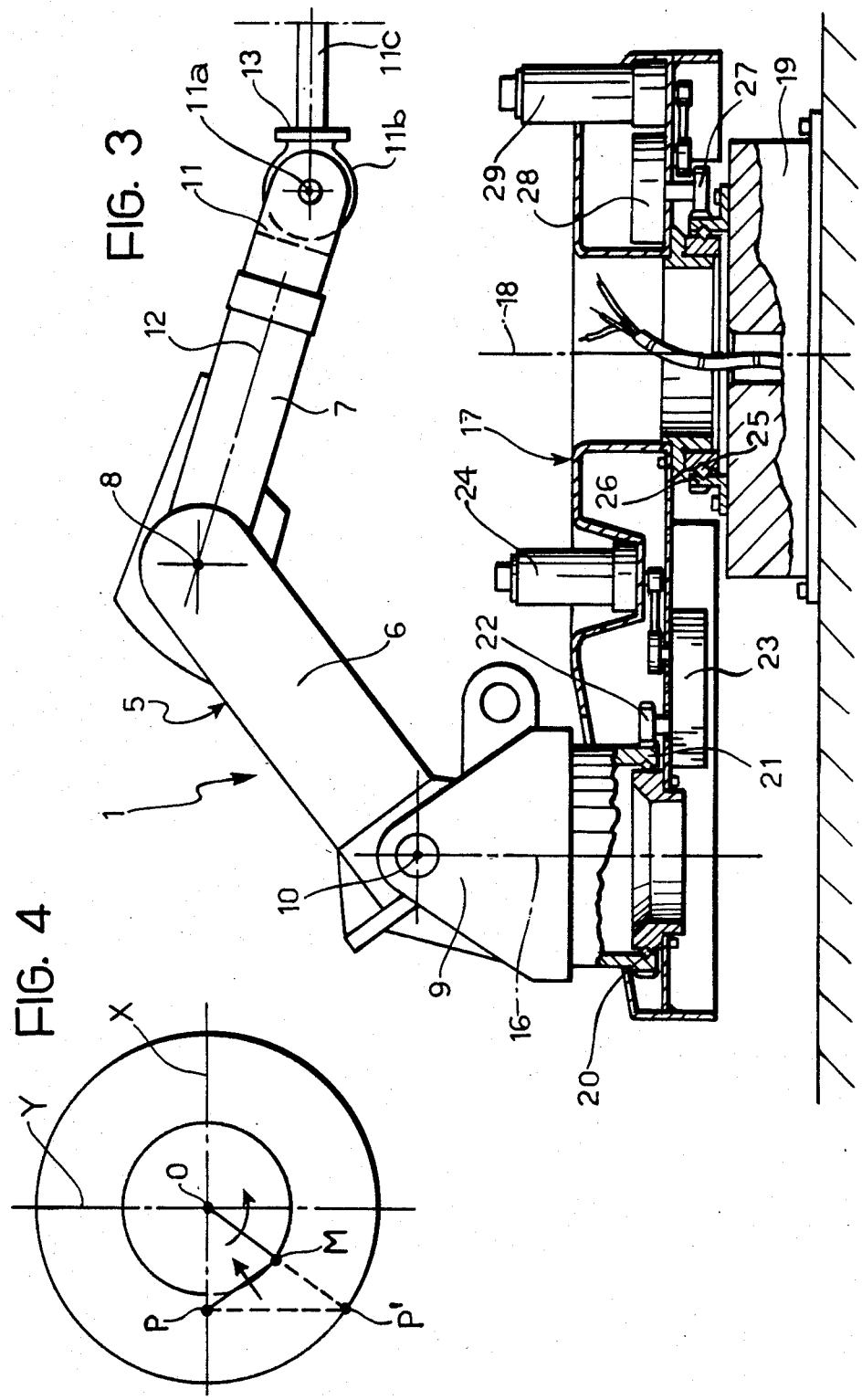

MANIPULATOR ROBOT, MORE PARTICULARLY FOR TRANSFERRING SHEET METAL ELEMENTS FROM A PRESSING STATION TO THE NEXT PRESSING STATION OF A PRESSING LINE

The present invention concerns a manipulator robot, particularly for transferring sheet metal elements from a pressing station to the next pressing station of a pressing line. More particularly the invention concerns manipulator robots of known kind including a base structure and a manipulating arm, including at least two arm elements articulated together, the said manipulating arm being connected at one end to the said base structure and being provided at the opposite end with means for manipulating the said elements.

The object of the present invention is to provide a manipulator robot of the kind specified above which can be used to advantage for transferring sheet metal elements from a pressing station to the next station of a pressing line, and which will allow in particular the conveying of the aforesaid elements of sheet metal at relatively high speeds, without the need for sudden accelerations or decelerations which might adversely affect the stability of the load conveyed.

In order to achieve this object, the invention comprises a manipulator robot of the kind specified above, characterised in that the aforesaid base structure to which the manipulating arm is connected is supported for rotation about a vertical axis by an ancillary support structure, and in that the said ancillary support structure is, in turn, supported by a fixed base for rotation about a vertical axis spaced from the vertical axis of rotation of the base structure of the manipulating arm, and in that means are provided to effect the rotation of the ancillary support structure and of the base structure of the manipulating arm at speeds with a controlled ratio to each other and in opposite directions.

Moreover, during a substantial part of the said rotation, the manipulating arm assumes a configuration such that the distance between the vertical axis of rotation of the base structure of the manipulating arm and the centre of gravity of the element conveyed is substantially equal to the distance between the two vertical axes of rotation of the base structure of the manipulating arm and of the ancillary support structure, so that the centre of gravity of the element conveyed describes a substantially rectilinear path with a substantially harmonic motion.

Achieving harmonic motion of the element being conveyed makes it possible to obtain relatively fast movements without sudden accelerations or decelerations which might adversely affect the stability of the load.

In a preferred embodiment, the said means for effecting the rotation of the base structure of the manipulating arm and of the ancillary support structure comprise two motor-reduction units mounted upon the said ancillary support structure, two pinions driven respectively by the said motor-reducer units, and two ring gears fixed respectively to the fixed base and to the base structure of the manipulating arm and meshing with the aforesaid pinions.

Figure 2:
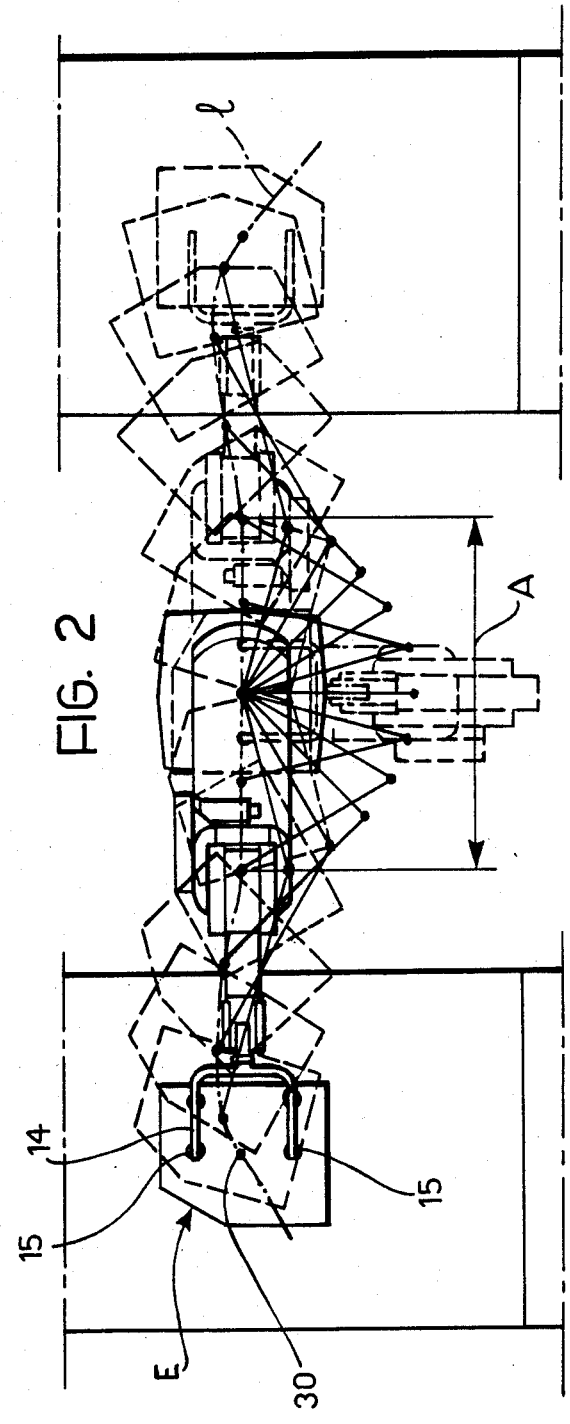

Further characteristics and advantages of the present invention will emerge from the following description, referring to the accompanying drawings supplied purely by way of non-limiting example, in which:

FIG. 1 is a diagrammatic elevational view which shows a manipulator robot according to the invention under different operating conditions, FIG. 2 is a diagrammatic plan view which shows the movement of the element conveyed by the robot of FIG. 1, FIG. 3 is a view on an enlarged scale and partially sectioned of the robot of FIG. 1, and FIG. 4 is a diagram pertinent to the operating principle of the robot according to the invention.

In FIGS. 1, 3, the reference numeral 1 indicates generally a manipulator robot for use particularly for transferring sheet metal elements (for example parts of the bodywork of motor vehicles) from one pressing station 2 (see FIG. 1) to the next station 3 of a pressing line. The said pressing line comprises a series of presses 4 (see FIG. 1) of the conventional kind.

The manipulator robot 1 consists of a manipulating arm 5 comprising two arm elements 6, 7 articulated together at 8. The manipulating arm 5 is articulated at one end to an upstanding base structure 9 about a horizontal axis 10 and is provided at the other end with means for manipulating the conveyed elements.

The structure and conformation of the manipulating arm 5 and of the base structure 9 are known per se and correspond substantially to those of a robot commercialised some time ago by the Applicant under the trade mark SMART. In conformity with this known arrangement, the free end of the manipulating arm 5 includes a "wrist" 11 which is rotatably mounted upon the arm element 7 about a longitudinal axis 12. Upon the "wrist" 11 there is, moreover, supported, for rotation about an axis 11a, a member 11b upon which a flange 13 is mounted for rotation about an axis 11c. In the example illustrated the flange 13 is furnished in turn with a pick-up fork member 14 for gripping the elements to be conveyed. The pick-up member 14 is provided with a sucker 15 designed to engage the upper surface of the sheet metal element E to be conveyed. The articulations of the wrist around the axes 11a, 11c serve to orientate the pick-up member during picking up and depositing of the pieces.

According to the invention the upstanding base structure 9 of the manipulating arm 5 is supported for rotation about a vertical axis 16 at one end of a lever 17, acting as an ancillary support structure, the opposite end of which lever is supported for rotation about a vertical axis 18 by a fixed base 19. The base structure 9 of the manipulator arm is rotatably supported by the support lever 17 through the interposition of a precision bearing 20. The reference numeral 21 indicates a ring gear which is fixed to the base structure 9 and which meshes with a pinion 22 driven by a reduction gear 23 of an electric motor 24. The motor reducer unit consisting of the motor 24 and the gear 23 is therefore able to effect rotation of the whole manipulating arm around the vertical axis 16 in relation to the support lever 17. The latter is in turn supported on the fixed base 19 by a precision bearing 25. The reference numeral 26 indicates a ring gear fixed to the fixed base 19 which meshes with a pinion 27 driven, through a reduction gear 28, by an electric motor 29. The motor-reducer unit consisting of the motor 29 and of the gear 28 is therefore able to effect rotation of the support lever 17 about the axis 18 relative to the fixed base 19.

The two motor-reducer units described above are arranged in such manner that the support lever 17 and the base structure 9 rotate about their respective axes of rotation 18, 16 at speeds having a controlled ratio to each other and in opposite directions. The speed of rotation of the base structure 9 relative to the support lever 17 is, in absolute value, substantially double the speed of rotation of the support lever 17 relative to the fixed base 19.

In FIG. 1 there is indicated by an unbroken line the position of the robot at the beginning of the path of travel of the pressed sheet metal element E from the pressing station 2 to the pressing station 3, whilst the intermediate position and the opposite end position of the robot are indicated in dashed outline.

In FIG. 2 there are indicated the various positions assumed by the pressed sheet metal element E during its movement from the pressing station 2 to the pressing station 3. The reference numeral 30 indicates the position of the centre of gravity of the pressed sheet metal element E during its movement from the pressing station 2 to the pressing station 3, and l indicates the trajectory followed by this centre of gravity during the movement of the element from one pressing station to the other.

According to a further characteristic of the invention, during a substantially central part (section A in FIG. 2) of the path of the sheet metal element, the manipulating arm 5 assumes a configuration such that the distance of the centre of gravity 30 from the vertical axis 16 is substantially equal to the distance between the two vertical axes 16, 18.

Thanks to the said characteristic, the centre of gravity 30 follows, during the movement of the element E, a substantially rectilinear path with substantially harmonic motion.

FIG. 4 illustrates diagrammatically the principle which is the basis of the phenomenon described above. This Figure illustrates diagrammatically in plan view the geometry of the system consisting of the support lever 17 and of the manipulating arm of the robot 1.

The point O corresponds to the axis of rotation 18, the point M corresponds to the axis of rotation 16, while the point P corresponds to the position of the centre of gravity 30 of the element being conveyed.

Therefore, according to the representation of FIG. 4, the support lever 17 is equivalent to an arm OM which rotates around the centre O in an anti-clockwise direction. The entire structure which is interposed between the support lever 17 and the element conveyed is on the other hand, similar to an arm PM which rotates in the clockwise direction and a speed substantially equal to the speed of the arm OM (relative to a stationary observer).

If the arm OM and the arm PM are of equal length, then the point P will always correspond with the projection on the axis X of the point P' which is obtained by extrapolating the arm OM until it intersects the circumference of the circle with its centre in O and radius equal to double the length of the arm OM. Since the point P' moves on the aforesaid circumference at a constant speed, it follows that its projection P on the axis X moves along the said axis with harmonic motion.

Obtaining a substantially harmonic motion for the pressed sheet metal element E makes it possible to achieve relatively high speeds of movement without sudden accelerations or decelerations which might prejudice the stability of the load being conveyed.

The structure described above has, moreover, special advantages from the point of view of simplicity and economy of construction.

Naturally the principle of the contrivance remaining unchanged details of construction of embodiments may be widely varied relative to what has been described and illustrated purely by way of example, without nevertheless going beyond the scope of the present invention.

I claim:

1. A manipulation robot for transferring sheet metal elements from a pressing station to the next station of a pressing arm comprising a fixed base, an ancillary support structure rotatably supported on said fixed base for rotation about a first vertical axis, a rotatable base structure rotatably supported on said ancillary support structure for rotation about a second vertical axis spaced from said first vertical axis, a manipulating arm including at least two arm elements articulated together, said manipulating arm being pivotably connected at one end to said rotatable base structure and having pickup means for picking up said elements connected to the opposite end of said manipulating arm, wrist means including a transversely extending pivot interposed between said manipulating arm and said pickup means, first drive means for effecting rotation of said ancillary support structure relative to said fixed base comprising a first electric motor-reducer unit mounted on said ancillary support structure, a first pinion driven by said first electric motor-reducer unit and a first ring gear secured to said fixed base in meshing engagement with said first pinion and second drive means for effecting rotation of said rotatable base structure relative to said ancillary support structure comprising a second electric motor-reducer unit mounted on said ancillary support structure, a second pinion driven by said second electric motor-reducer unit and a second ring gear secured to said rotatable base structure in meshing engagement with said second pinion whereby said rotatable base structure may be rotated at speeds having a controlled ratio with respect to each other and in opposite directions.

* * * * *